(12) United States Patent
Spinelli et al.

(10) Patent No.: US 7,593,440 B2
(45) Date of Patent: Sep. 22, 2009

(54) MOPA LASER APPARATUS WITH TWO MASTER OSCILLATORS FOR GENERATING ULTRAVIOLET RADIATION

(75) Inventors: Luis A. Spinelli, Sunnyvale, CA (US); Andrea Caprara, Mountain View, CA (US); Andrei Staroudoumov, Cupertino, CA (US); Norman Hodgson, Belmont, CA (US)

(73) Assignee: Coherent, Inc., Santa Clara, CA (US)

( * ) Notice: Subject to any disclaimer, the term of this patent is extended or adjusted under 35 U.S.C. 154(b) by 251 days.

(21) Appl. No.: 11/387,400

(22) Filed: Mar. 23, 2006

(65) Prior Publication Data

US 2006/0222372 A1 Oct. 5, 2006

Related U.S. Application Data

(60) Provisional application No. 60/734,564, filed on Nov. 8, 2005, provisional application No. 60/666,047, filed on Mar. 29, 2005.

(51) Int. Cl.
*H01S 3/10* (2006.01)

(52) U.S. Cl. .............................. 372/22; 372/9; 372/21; 372/23; 372/25

(58) Field of Classification Search ............... 372/22, 372/9, 21, 23, 25
See application file for complete search history.

(56) References Cited

U.S. PATENT DOCUMENTS

| | | | |
|---|---|---|---|
| 5,136,597 A | 8/1992 | Nightingale | 372/21 |
| 6,249,371 B1 | 6/2001 | Masuda et al. | 359/326 |
| 6,498,801 B1 | 12/2002 | Dudelzak et al. | 372/22 |
| 6,590,698 B1 | 7/2003 | Ohtsuki et al. | 359/326 |
| 6,639,732 B2 | 10/2003 | Omura et al. | 359/727 |
| 6,653,024 B1 | 11/2003 | Shiraishi et al. | 430/5 |
| 6,781,672 B2 | 8/2004 | Motegi | 355/69 |
| 6,894,826 B2 | 5/2005 | Doi | 359/326 |
| 2002/0054613 A1* | 5/2002 | Kang | 372/6 |

OTHER PUBLICATIONS

A. Caprara et al., "200 mW Continuous Wave laser source at 198.5 nm for Lithographic Applications," *Proceedings of SPIE (Optical Microlithography XVII) Bellingham, Washington*, vol. 5377 (2004), pp. 1876-1885.
J. Sakuma et al., "High power, narrowband, DUV laser source by frequency mixing in CLBO," *Advanced High-Power Lasers and Applications*, vol. No. 20, Dec. 2000, pp. 7-14.
J. Sakuma et al., "CW DUV light sources for inspection tools," *25th Annual BACUS Symposium on Photomask Technology—Proceedings of SPIE*, vol. 5992 (2005), 8 pages in length.

* cited by examiner

*Primary Examiner*—Minsun Harvey
*Assistant Examiner*—Yuanda Zhang
(74) *Attorney, Agent, or Firm*—Morrison & Foerster LLP

(57) ABSTRACT

Laser apparatus including two different, pulsed MOPAs, one having a fundamental wavelength of 1064 nm and the other having a fundamental wavelength of 1564 nm, provide trains of optical pulses. The 1064-nm pulses are frequency tripled to 355 nm and the 1564-nm pulses are frequency doubled to 782 nm. The 355-nm and 782-nm pulses are mixed to provide 244-nm pulses. The 244-nm pulses are mixed with residual 1064-nm pulses to provide 198-nm output pulses of the apparatus. The output pulses can be either digitally modulated or amplitude modulated by controlling the phase relationship between the 1064-nm and 1564-nm pulses.

23 Claims, 9 Drawing Sheets

MOPA LASER APPARATUS WITH TWO MASTER OSCILLATORS FOR GENERATING ULTRAVIOLET RADIATION

PRIORITY CLAIM

This application claims the priority of U.S. Provisional Application No. 60/734,564, filed Nov. 8, 2005, and U.S. Provisional Application No. 60/666,047, filed Mar. 29, 2005, both of which are incorporated by reference.

TECHNICAL FIELD OF THE INVENTION

The present invention relates in general to fiber lasers. The invention relates in particular to generating ultraviolet (UV) radiation by frequency-converting the fundamental wavelength output of fiber lasers having a fundamental wavelength of 1000 nanometers (nm) or longer, i.e., a wavelength in the near infrared (NIR).

DISCUSSION OF BACKGROUND ART

UV laser radiation at wavelengths less than 200 nm and average power greater than 1 Watt (W) is useful in industrial applications such as laser machining, lithography, and optical inspection. Presently, the only laser types that will generate 1 W or more of such radiation directly, i.e., as the fundamental wavelength, are excimer and molecular fluorine (F) lasers. These lasers are very expensive to operate and maintain compared with other laser types such as diode-pumped solid-state (DPSS) lasers, including fiber lasers, which, unfortunately, have fundamental wavelengths at 900 nm or more.

Generation of sub-200 nm UV radiation from a DPSS laser having a fundamental wavelength greater than 900 nm requires that the fundamental output of the laser be frequency converted by frequency-doubling and sum-frequency mixing in a series of optically nonlinear crystals. In order to convert the output of such lasers having a wavelength of 1000 nm or more to a wavelength less than 200 nm, conversion would have to be to the sixth or higher harmonic. Harmonic conversion is limited, however, by the availability of optically nonlinear crystal materials that can transmit UV radiation less than 200 nm. A crystal of cesium lithium borate (CLBO) is presently the most preferred crystal for converting at wavelengths less than 200 nm, but even so, is limited to converting to wavelengths longer than about 190 nm.

Ytterbium-doped (Yb-doped) fiber lasers and neodymium-doped (Nd-doped) yttrium aluminum garnet (YAG) lasers have a fundamental wavelength of about 1064 nm. The sixth harmonic of this fundamental wavelength is about 177 nm, which is shorter than can be converted in CLBO. The fifth harmonic however is a wavelength longer than 200 nm. Erbium-doped (Er-doped) fiber-lasers can generate fundamental radiation at wavelengths between about 1510 nm and 1590 nm. The eighth harmonic (8H) of any of these wavelengths longer than 1520 nm would be less than 200 nm and within the conversion range of CLBO.

Schemes for generating the eighth harmonic of the output of an Er-doped fiber laser are disclosed in U.S. Pat. No. 6,590,698. In one conversion scheme disclosed therein, the second harmonic (2H) is generated in a first optically nonlinear crystal. The third-harmonic (3H) is generated in a second optically nonlinear crystal by sum frequency mixing the 2H-radiation with residual fundamental radiation. Fourth-harmonic (4H) radiation is generated by frequency doubling 2H-radiation in a third optically nonlinear crystal. A fourth optically nonlinear crystal sum-frequency mixes the 3H- and 4H-radiation to generate seventh-harmonic (7H) radiation having a wavelength of about 220 nm, and a fifth optically nonlinear crystal generates 8H-radiation (about 193-nm radiation) by sum-frequency mixing the 7H radiation with residual fundamental radiation.

As any sum-frequency mixing or frequency-doubling operation in an optically nonlinear crystal is at best only about 50% efficient, the overall conversion efficiency from a cascade of five such operations will be less than 3%. This would require a laser having a fundamental power of 32 W in order to provide UV (less than 200 nm) radiation having a power of more than 1 W. Clearly, there is a need for a more efficient scheme for generating sub-200 nm radiation by frequency conversion of the output of solid-state lasers.

SUMMARY OF THE INVENTION

The present invention is directed to methods of generating optical pulses. In one aspect, the invention comprises delivering pulses having first and second fundamental wavelengths from respectively first and second lasers. The first-wavelength pulses are frequency multiplied to provide pulses having a wavelength that is a harmonic wavelength of the first fundamental wavelength. The second-wavelength pulses are frequency multiplied to provide pulses having a wavelength that is a harmonic wavelength of the second fundamental wavelength. The harmonic-wavelength pulses are then sum-frequency mixed to provide frequency-converted pulses having a first frequency-converted wavelength that is less than either of the harmonic wavelengths.

The frequency-converted wavelength pulses may be sum-frequency mixed with fundamental pulses from any one of the first and second lasers to provide frequency converted pulses having a second frequency-converted wavelength that is shorter than the first frequency-converted wavelength. In examples of the inventive method, two pulsed lasers having a fundamental wavelength between about 800 nm and 1700 nm can be used to provide frequency converted pulses having a wavelength less than 200 nm in three frequency-multiplication steps and two sum-frequency mixing steps.

In another aspect, the invention comprises delivering first and second trains of pulses having the same pulse repetition frequency and having respectively first and second wavelengths to an optically nonlinear crystal. The optically nonlinear crystal is arranged to sum-frequency mix the first- and second-wavelength pulses to provide frequency-converted pulses having a third wavelength when pulses in the trains thereof temporally overlap at the optically nonlinear crystal. The frequency-converted pulses are either digitally modulated or modulated in amplitude by varying the phase relationship between said first and second pulse trains to vary the degree of temporal overlap.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
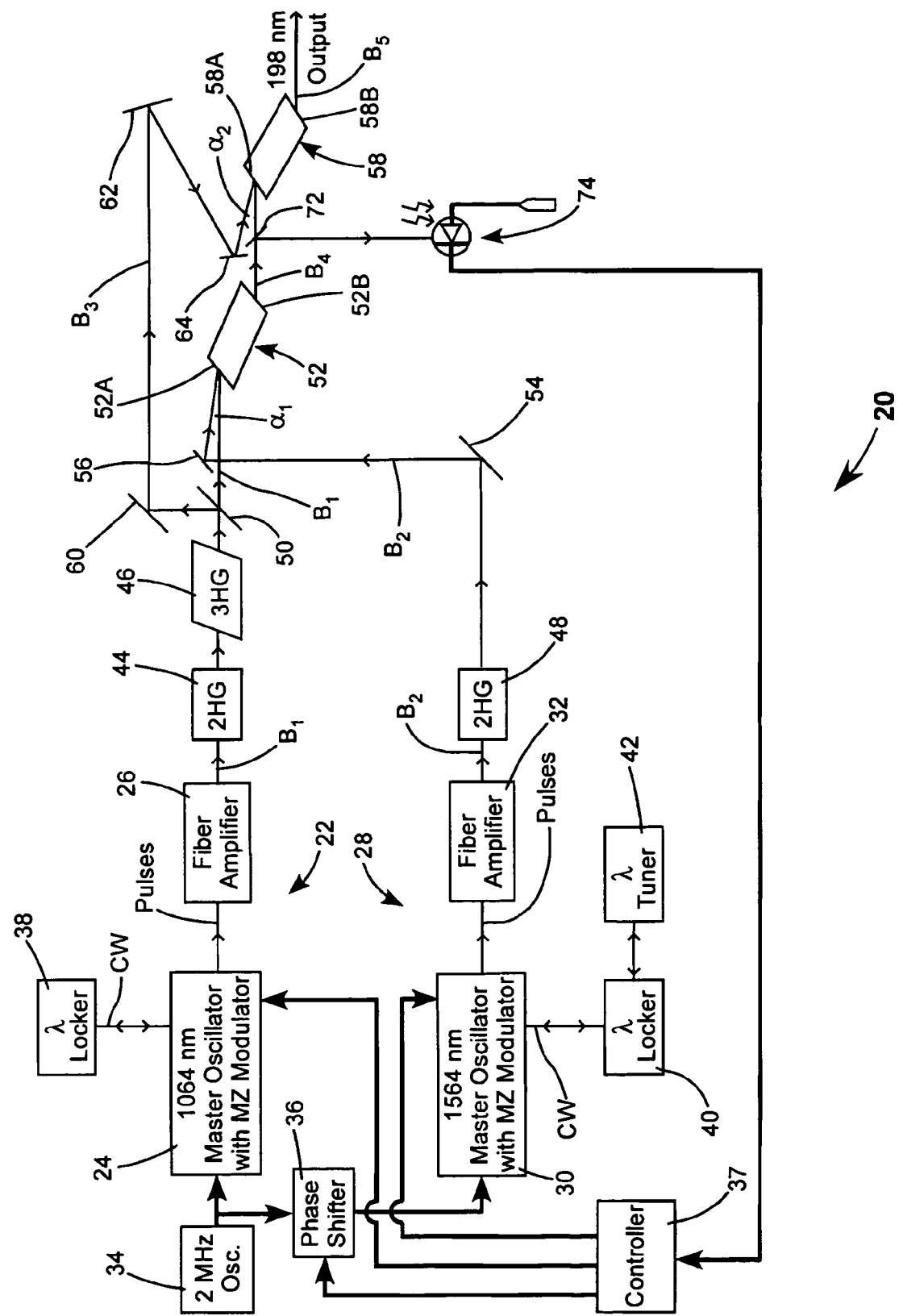
FIG. 1 schematically illustrates one preferred embodiment apparatus in accordance with the present invention including first and second optical fiber master-oscillator power-amplifiers (MOPAs) generating laser radiation pulses at respectively first and second fundamental wavelengths, the MOPAs being slaved to a master clock via a phase shifter, and the apparatus further including five optically nonlinear crystals, a first and second of the optically nonlinear crystals generating the third-harmonic of the first fundamental wavelength, a third optically nonlinear crystal generating the second harmonic of the second fundamental wavelength, a fourth of the optically nonlinear crystals mixing the third harmonic of the first fundamental wavelength with the second harmonic of the second fundamental wavelength to provide an intermediate UV wavelength, and a fifth of the optically nonlinear crystals mixing the intermediate UV wavelength with the first fundamental wavelength to provide output pulses of UV radiation having a wavelength less than 200 nm.

Referring now to the drawings, wherein like components are designated by like reference numerals, FIG. 1 schematically illustrates one preferred embodiment 20 of laser apparatus in accordance with the present invention. In the drawing, optical beam paths are depicted by fine lines, with open arrowheads indicating propagation direction. Electrical or electronic connections are depicted in bold line, with the communication direction indicated by closed arrowheads.

Apparatus 20 includes fiber laser MOPAs 22 and 28. MOPA 22 includes a fiber master oscillator 24 having a Yb-doped gain fiber, and providing fundamental radiation at a wavelength of about 1064 nm. The oscillator is preferably operated in a continuous-wave (CW) mode with the CW output being modulated, preferably by a modulator such as an integrated Mach-Zehnder (MZ) modulator. At the 1064 nm wavelength, it may be found advantageous to employ two such modulators in series to ensure an acceptable contrast ratio. A portion of the CW radiation is directed to a wavelength locker 38 that maintains a predetermined operating wavelength of the laser. Pulses output by the modulated fiber laser are amplified by a Yb-doped fiber amplifier 26. As fiber lasers, fiber amplifiers, wavelength lockers and MZ modulators are well known in the art to which the present invention pertains, and a detailed description thereof is not necessary for understanding principles of the present invention, such a detailed description is not presented herein.

MOPA 28 is arranged similar to MOPA 22. A fiber laser 30 of MOPA 28 includes an Er-doped gain fiber. Laser 30 is operated in the same manner as laser 24 of MOPA 22 and, in this example, provides laser pulses having a wavelength of about 1564 nm to an Er-doped fiber amplifier 32. A portion of the CW radiation is directed to a wavelength locker 40, which maintains a predetermined operating wavelength of the laser. A tuner 42 provides that the locked wavelength is adjustable within the tuning range of the Er-doped gain fiber. As several tuning schemes for Er-doped fiber lasers are well-known in the art, and as a knowledge of such schemes is not necessary for understanding principles of the present invention, a detailed description of any one of the schemes is not presented herein.

Pulse delivery by MOPAs 22 and 28 is controlled by a controller 37 cooperative with a 2-MHz oscillator 34, a phase shifter 36, and the integral MZ modulators (not explicitly shown) of the master oscillators. A radio frequency (RF) signal (here, 2 MHz) voltage from oscillator 34 is delivered to one electrode of the MZ modulator (or modulators) of master oscillator 24 and via phase shifter 36 to one electrode of the MZ modulator of master oscillator 30. Controller 37 provides digital signals to another electrode of the MZ modulators of the master oscillators for keying the MZ modulators. Each master oscillator delivers a train of pulses at a pulse repetition frequency (PRF) that is determined by the frequency of oscillator 34, and with a pulse duration that is determined by the keying signals applied to the MZ modulators. The phase difference between the two pulse trains is controlled by controller 37 in cooperation with phase shifter 34 using standard phase-shift-keying (PSK) techniques. MOPAs as described here will deliver pulses at a PRF in the megahertz range with pulse durations of less than 5 ns and even less than 1 ns.

It should be noted, here, that while the above described modulation scheme is a preferred modulation scheme, other modulation schemes may be employed without departing from the spirit and scope of the present invention. By way of example, master oscillators 24 and 30 may be directly modulated by modulating the optical pump source of the lasers. Whatever modulation scheme is employed, however, there must be some provision for adjusting the relative phase of pulse trains emitted by the lasers.

Provision of phase control is important in apparatus 20, as frequency-converted pulses from each MOPA are required to be further frequency converted by at least one optically nonlinear crystal, common to both. The fiber length in each MOPA amplifier will almost certainly be different. Beam paths followed by the pulses from each MOPA to a common crystal will also almost certainly be different. This being the case, and given that a 1-ns pulse has an optical path length in air of only about 30 centimeters (cm), phase control between the pulse trains generated by the MOPAs must be provided to ensure that the corresponding frequency converted pulses arrive simultaneously at the common optically nonlinear crystal, thereby allowing further frequency conversion to take place. Phase control can be automatically implemented by detecting the mixing product output of any common optically nonlinear crystal, communicating this output to controller 37. Controller 37 can then command phase shifter 36 to adjust the relative phase of the MOPAs until the detected mixing product is maximized. This phase control also enables a method of either digitally modulating or amplitude modulating UV output pulses of the apparatus. The method is described in detail further hereinbelow.

Continuing with reference to FIG. 1, in a preferred frequency-conversion architecture for pulses delivered by MOPAs 22 and 28, amplified 1064-nm pulses from fiber amplifier 26 follow a path $B_1$ to an optically nonlinear crystal 44, which is arranged to generate the second harmonic of the pulse wavelength. In this preferred conversion architecture, crystal 44 is a lithium borate (LBO) crystal, 20 millimeters (mm) long, and arranged for non-critical phase matching. 2H-radiation pulses generated by crystal 44 and having a wavelength of about 532 nm are sum-frequency mixed with pulses of residual fundamental (1064-nm) radiation in another optically nonlinear crystal 46 to generate 3H-pulses having a wavelength of about 355 nm. Crystal 46 is preferably also a lithium borate (LBO) crystal preferably 10 mm long, and arranged for Type-II phase-matching with walk-off compensation. Type-II phase matching with walk-off compensation is described in detail in U.S. Pat. No. 5,136,597, assigned to the assignee of the present invention, and the complete disclosure of which is hereby incorporated by reference.

Amplified 1564 nm pulses from fiber amplifier 26 follow a path $B_2$ to an optically nonlinear crystal 48, which is arranged to generate the second harmonic of the pulse wavelength to provide radiation pulses having a wavelength of about 782 nm. Crystal 48 is also an LBO crystal, preferably 20 mm long, and arranged for non-critical phase matching similar to crystal 44.

In the path $B_1$ of 355 nm pulses from optically nonlinear crystal 46 is a dichroic beamsplitter 50 that reflects pulses of residual fundamental (1064-nm) radiation along a path $B_3$ to be used in a later sum-frequency mixing stage. The 355-nm pulses are transmitted by the beamsplitter, proceed along path $B_1$ and are incident on a face 52A of an optically nonlinear crystal 52. Crystal 52 is preferably β-barium borate (BBO), and more preferably CLBO. In this example the crystal is a CLBO crystal preferably 15 mm long, and is cut and arranged such that the 355-nm radiation is incident at Brewster's angle for the crystal material at that wavelength. Path $B_2$ is folded by mirrors 54 and 56 such that 2H-radiation (782-nm) pulses traveling therealong are incident on face 52A of crystal 52 at an angle close to Brewster's angle for the crystal material at the 782-nm wavelength, such that the 2H-radiation propagates substantially collinear with the 355-nm radiation within crystal 52. This means, for a CLBO crystal, that there will be an angle of about 1.6 degrees between paths $B_1$ and $B_2$ at face 52A of the crystal. Crystal 52, in this example is arranged for Type-I phase-matching for the 355-nm and 782-nm wavelengths and generates radiation pulses having a wavelength of about 244 nm by sum-frequency mixing, provided, of course, the above-described phase control between the MOPAs is adjusted such that the 355-nm and 782-nm radiation arrive simultaneously at crystal 52.

The 244-nm radiation pulses exit crystal 52 via face 52B thereof along a path $B_4$. A beam sampler 72, for example, a tilted, uncoated calcium fluoride ($CaF_2$) plate, directs a portion (for example, less than 1%) of the output of crystal 52 to a high speed UV photodiode 74. The output of photodiode 74 is transmitted to controller 37 for phase control implementation as discussed above. The remaining portion of the 244-nm pulses are incident on a face 58A of an optically nonlinear crystal 58, which is preferably 15 mm long, and cut and arranged such that the 244-nm radiation is incident at Brewster's angle for the crystal material at that wavelength. Crystal 58 is preferably a CLBO crystal, about 15 mm long, and cut and arranged for Type-I phase matching for the 244-nm wavelength and the 1064-nm fundamental wavelength of MOPA 22. Path $B_3$, along which residual 1064-nm radiation pulses are propagating, is folded by mirrors 60 and 62 such that the 1064-nm radiation pulses are incident on face 58A of crystal 58 at an angle close to Brewster's angle for the crystal material at the 1064-nm wavelength, such that the 244-nm radiation propagates substantially collinear with the 1064-nm radiation inside crystal 58. For a CLBO crystal, there will be an angle of about 4.5 degrees between paths $B_3$ and $B_4$ at face 58A of crystal 58. Crystal 58 generates 198 nm radiation (output) pulses by sum-frequency mixing the 244 nm and 1064 nm input pulses. Care must be taken to match the optical length of path $B_3$ with the optical distance along paths $B_1$ (from dichroic beamsplitter 50) and $B_4$ to crystal 58 such that the desired phase relationship of the 1064-nm and 244-nm pulses is maintained at crystal 58. The 198-nm output pulses exit crystal 58 via face 58B thereof along a beam path $B_5$. Any residual (longer) wavelength pulses exiting crystal 58 will be propagating at some angle to path $B_5$ and can be separated from the 198-nm pulses by spatial filtering.

It should be noted here that while CLBO is a particularly preferred crystal material for crystal 58, there is another crystal material, potassium aluminum borate (KABO) that may also be more or less useful, depending on the particular wavelengths that are to be finally mixed. The material has a phase-matching limit that extends to shorter fundamental wavelengths than that of CLBO, has a transparency comparable to CLBO and has a nonlinear coefficient that is between about 0.2 pM/V and 0.45 pM/V. This material, however, has not yet been commercially developed. Another possible crystal material is potassium beryllium barium fluoride (KBBF), also in the early stages of commercial development.

Apparatus 20 has certain advantages over prior-art apparatus in that by employing two lasers, the power required to be produced by the 1564-nm laser is reduced compared with above discussed schemes in which only an Er-doped fiber laser is employed. In the inventive scheme, each laser is operating at a wavelength close to a peak-gain wavelength. The maximum number of frequency conversion (sum-frequency mixing or harmonic generating) stages for any one laser is four. The shortest wavelength generated by the penultimate conversion stage (here, at crystal 58) is 240 nm compared with 220 nm in the above-described prior-art arrangement. This relatively small wavelength difference considerably extends the life of the optically non-linear crystal in the penultimate conversion stage by reducing UV degradation of the crystal. An advantage of the apparatus relating to the frequency conversion architecture thereof is that combining beam paths $B_1$ and $B_2$ and beam paths $B_3$ and $B_4$ by Brewster's angle incidence at the corresponding crystal faces eliminates a requirement for dichroic mirrors to provide such beam path combination. At wavelengths less than about 400 nm, even the best commercially available mirrors are lossy to some extent, and become increasingly lossy the shorter the wavelength. Such mirrors are also subject to degradation by short-wavelength UV radiation.

Figure 2:
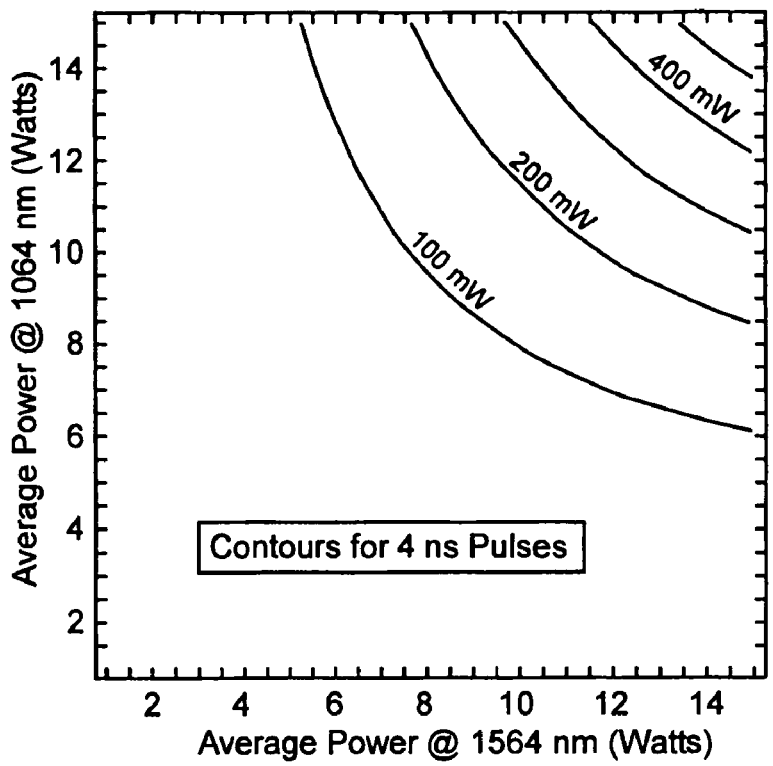
FIG. 2 is a contour graph showing computed output radiation power as a function of average fundamental power of the first and second MOPAs in an example of the apparatus of FIG. 1 wherein fundamental radiation pulses have a duration of 4 nanoseconds (ns).
Figure 3:
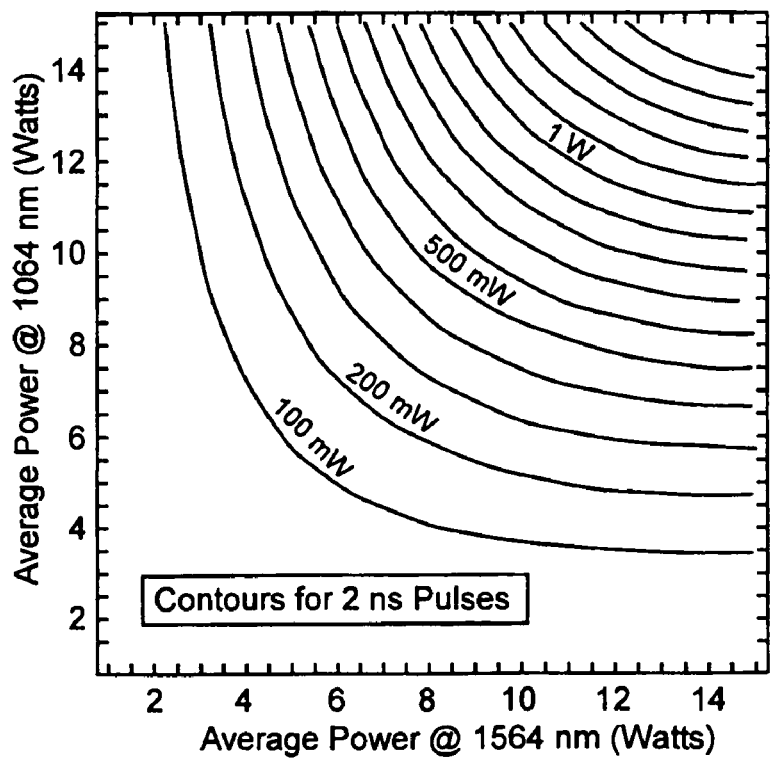
FIG. 3 is a contour graph showing computed output radiation power as a function of average fundamental power of the first and second MOPAs in another example of the apparatus of FIG. 1 wherein fundamental radiation pulses have a duration of 2 ns.
Figure 4:
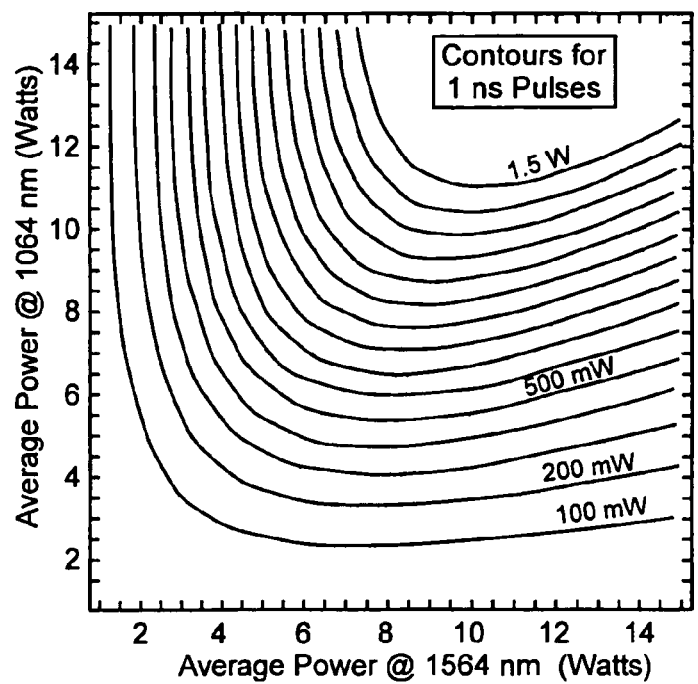
FIG. 4 is a contour graph showing computed output radiation power as a function of average fundamental power of the first and second MOPAs in yet another example of the apparatus of FIG. 1 wherein fundamental radiation pulses have a duration of 1 ns.

Regarding the potential efficiency of apparatus 20, FIG. 2 schematically depicts, in contour graph form, computed 198-nm output power (the contours) as a function of average fundamental power delivered by MOPAs 22 and 28 for pulses having a duration of 4 ns delivered at a frequency of 2 MHz. It is assumed in the computation that the optically nonlinear crystals are of the preferred materials and dimensions discussed above, with crystal 52 being a CLBO crystal. It is also assumed that there is a beam-waist dimension of 40.0 mm in 2H-generating, optically nonlinear (LBO) crystals 44 and 48, and that this beam-waist dimension is relay-imaged, at unitary (1:1) magnification into crystals 46, 52, and 58. FIG. 3 and FIG. 3 schematically depict, also in contour graph form, computed 198-nm output power as a function of average fundamental power delivered by MOPAs 22 and 28 for pulses having durations of 2 ns and 1 ns, respectively, delivered at a frequency of 2 MHz with the same assumptions for crystal materials and dimensions, and beam sizes therein. From FIG. 3 it can be seen that a total power (combined power of MOPAs 22 and 28) of about 22 W is required to provide 1 W of 198-nm output radiation with a pulse duration 2 ns. From FIG. 4 it can be seen that a total power of less than 17 W is required when the pulse duration is reduced to 1 ns.

While the frequency conversion architecture discussed above is a particularly preferred frequency conversion architecture for the inventive apparatus, other frequency-conversion architectures may be employed with departing from the spirit and scope of the present invention. By way of example, the fourth harmonic of the Er-doped fiber MOPA 28 (with a fundamental wavelength between 1510 nm and 1570 nm) can be generated using first and second optically nonlinear crystals in one beam path, and the second harmonic of the Yb-doped MOPA 22 (with a fundamental between about 1040 nm and 1060 nm) can be generated using a third optically nonlinear crystal in another beam path. The second harmonic of the 1040-nm to 1060-nm radiation is then mixed with the fourth harmonic of the 1510-nm to 1570-nm radiation in a fourth optically nonlinear crystal to provide an intermediate UV wavelength between about 220 nm and 222 nm. This intermediate wavelength is then mixed with the 1510-nm to 1570-nm fundamental-wavelength radiation in a fifth optically nonlinear crystal to provide an output UV wavelength of about 193 nm. Using this conversion architecture, 193-nm radiation can be produced, for example, from fundamental wavelengths of 1040 nm and 1534 nm, 1050 nm and 1526 nm, and 1060 nm and 1517 nm. A disadvantage of this particular architecture is that final mixing stage cannot be effectively carried out in the preferred CLBO crystal because the wavelengths to be mixed are outside of the phase matching limit (boundaries) of CLBO. This same disadvantage also applies to the above-discussed prior-art, eighth-harmonic generating scheme.

It is emphasized, here, that the present invention is not limited to using two pulsed lasers (or MOPAs) of any particular type. Preferably, however, any laser used as one of the two lasers in the inventive apparatus should provide a fundamental wavelength between about 800 nm and 1700 nm. Any two lasers used in the inventive apparatus preferably either inherently deliver, or can be controlled to deliver, pulses of about the same duration. Any two lasers used in the inventive apparatus must also be capable of being synchronized such that frequency multiplied (harmonic) pulses generated from fundamental pulses delivered by the lasers can be delivered simultaneously to an optically nonlinear crystal arranged to sum-frequency mix the frequency multiplied harmonic pulses.

In the description presented above, it is mentioned that controlling the phase between pulse trains emitted by the two lasers of apparatus 20 of FIG. 1 could be used as a method for digitally modulating or amplitude modulating UV output of the apparatus. A description of this method is set forth below, beginning with reference to FIGS. 5A, 5B and 5C.

Figure 5A:
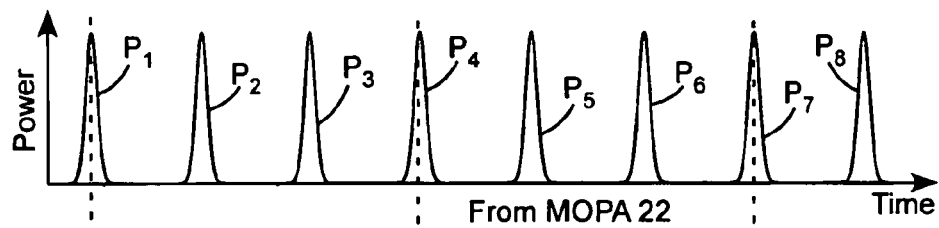
FIGS. 5A-C are timing diagrams schematically illustrating digitally modulating the UV output pulses of the apparatus of FIG. 1 by operating the phase shifter to shift the output pulses of the MOPAs in and out of phase.
Figure 5B:
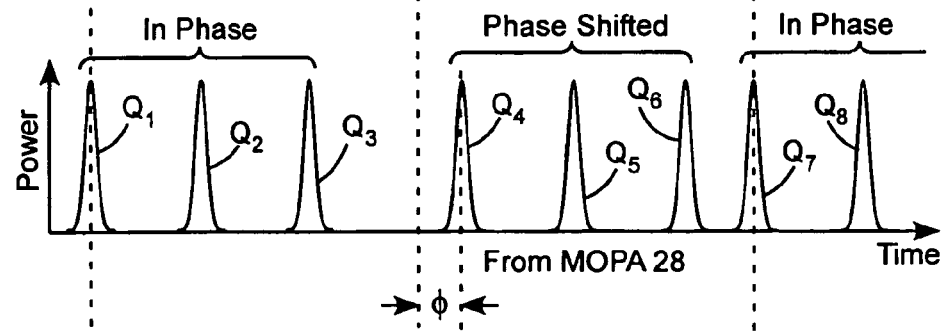
Figure 5C:
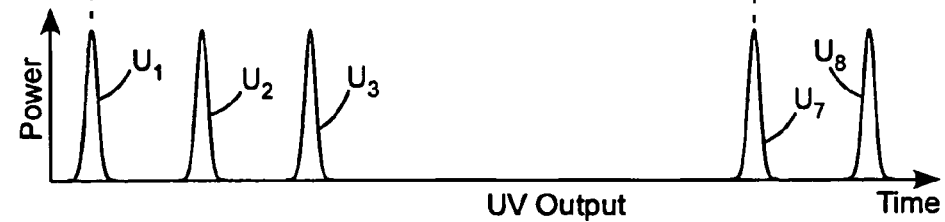

FIG. 5A schematically depicts a train of 355-nm pulses, being the frequency-tripled output of MOPA 22 at face 52A of optically nonlinear crystal 52 of FIG. 1. FIG. 5B schematically depicts a train of 782 nm pulses, being the frequency-tripled output of MOPA 28 at face 52A of optically nonlinear crystal 52 of FIG. 1. FIG. 5C schematically depicts a train of UV output pulses resulting from frequency mixing (or not) of the 355-nm and 782-nm pulses by crystal 52. Here, three 355-nm pulses $P_1$, $P_2$ and $P_3$, are exactly in phase with three 782-nm pulses $Q_1$, $Q_2$ and $Q_3$ and generate a corresponding three UV (here 244 nm) pulses $U_1$, $U_2$, and $U_3$.

Three 782-nm pulses $Q_4$, $Q_5$, and $Q_6$, are phase-shifted by phase shifter 36 of FIG. 1 by an amount $\psi$, sufficient that there is no temporal overlap between these pulses and corresponding 355-nm pulses $P_4$, $P_5$, and $P_6$. As there is no temporal overlap, there is no mixing, and no UV output pulses are generated. 355-nm pulses $P_7$ and $P_8$ are reset in phase with 782-nm pulses $Q_7$ and $Q_8$ by phase shifter 36, thereby generating corresponding UV output pulses $U_7$ and $U_8$.

In the above-described implementation of the inventive output-modulating, 244-nm UV pulses are either generated or not generated by crystal 52. When the 244-nm pulses are not generated by crystal 52 there will, correspondingly, not be any generation of 198-nm pulses by crystal 58. This can be defined as digitally modulating the output of apparatus 20 of FIG. 1. A description of how phase shifting can be used to amplitude modulate the output is set forth below with reference to FIGS. 6A, 6B, and 6C.

Figure 6A:
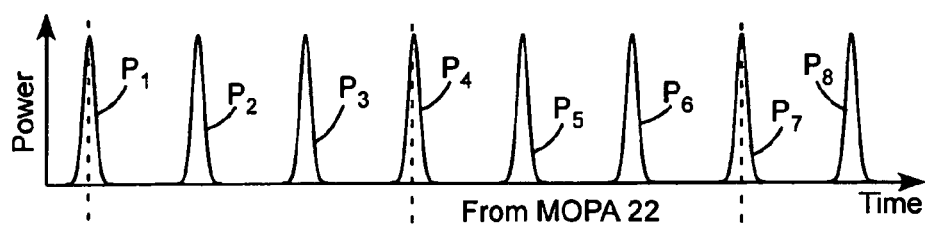
FIGS. 6A-C are timing diagrams schematically illustrating amplitude modulating the UV output pulses of the apparatus of FIG. 1 by operating the phase shifter to shift the output pulses of the MOPAs in and out of phase.
Figure 6B:
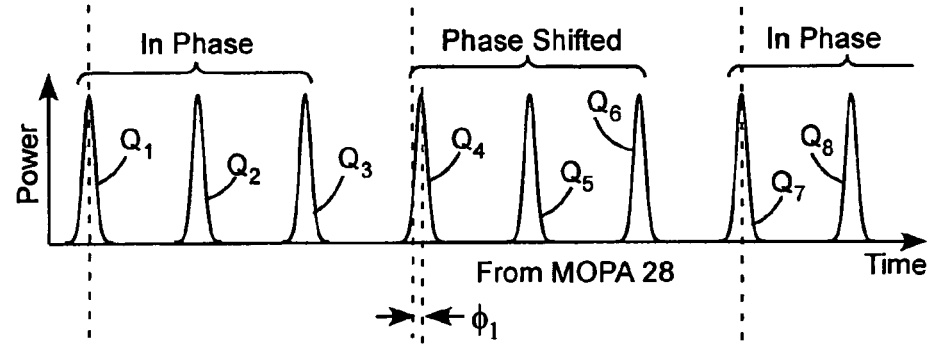
Figure 6C:
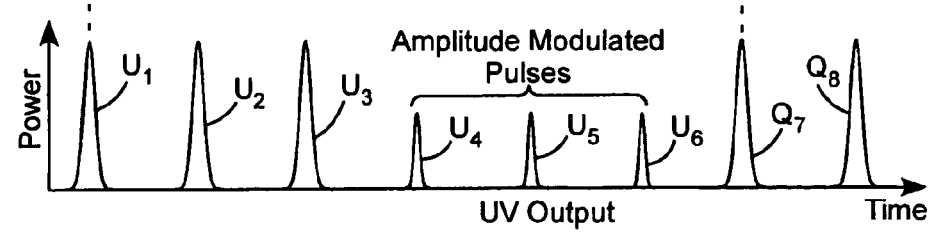

FIG. 6A schematically depicts a train of 355-nm pulses, similar to the pulses of FIG. 5A. FIG. 6B schematically depicts a train of 782-nm pulses. FIG. 6C schematically depicts a train of UV output pulses resulting from frequency mixing of the 355-nm and 782-nm pulses by crystal 52. Here, three 355-nm pulses $P_1$, $P_2$ and $P_3$, are exactly in phase with three 782-nm pulses $Q_1$, $Q_2$ and $Q_3$ and generate a corresponding three UV (here 244 nm) pulses $U_1$, $U_2$, and $U_3$. Three 782-nm pulses $Q_4$, $Q_5$, and $Q_6$, are phase-shifted by phase shifter 36 of FIG. 1 by an amount $\psi_1$, such that temporal overlap between these pulses and corresponding 355-nm pulses $P_4$, $P_5$, and $P_6$ is no longer exact. As the temporal overlap is not exact, UV pulses $U_4$, $U_5$, and $U_6$ will have a lower peak power than pulses $U_1$, $U_2$, and $U_3$, and can be considered as being amplitude modulated. 355-nm pulses $P_7$ and $P_8$ are reset in phase with 782-nm pulses $Q_7$ and $Q_8$ by phase shifter 36, thereby generating corresponding UV output pulses $U_7$ and $U_8$, having the maximum power, i.e, that of pulses $U_1$, $U_2$, and $U_3$.

A particular advantage of either digitally modulating or amplitude modulating the output of apparatus 22 of FIG. 1 is that MOPAs 22 and 28 continue to deliver fundamental radiation pulses at an essentially constant rate and average power while the frequency-converted output is being modulated. This provides that the MOPAs, once started and stabilized, can operate under constant thermal and mechanical conditions, thereby minimizing fluctuations in fundamental pulse power, and accordingly of UV output.

Those skilled in the art will recognize that the above-discussed frequency-converted-output modulating method is not limited to use with fiber MOPAs having the particular frequency-conversion architecture of FIG. 1. The method is applicable in apparatus wherein any two pulsed lasers, be they fiber lasers, semiconductor lasers, solid-state lasers, or gas lasers, with or without supplementary amplification, deliver pulses of either frequency-converted or fundamental radiation to a common optically nonlinear crystal for frequency conversion. The lasers do not need to provide different fundamental wavelengths. The lasers can be lasers of exactly the same fundamental wavelength, and the lasers do not need to provide either of the particular fundamental wavelengths discussed above.

Figure 7:
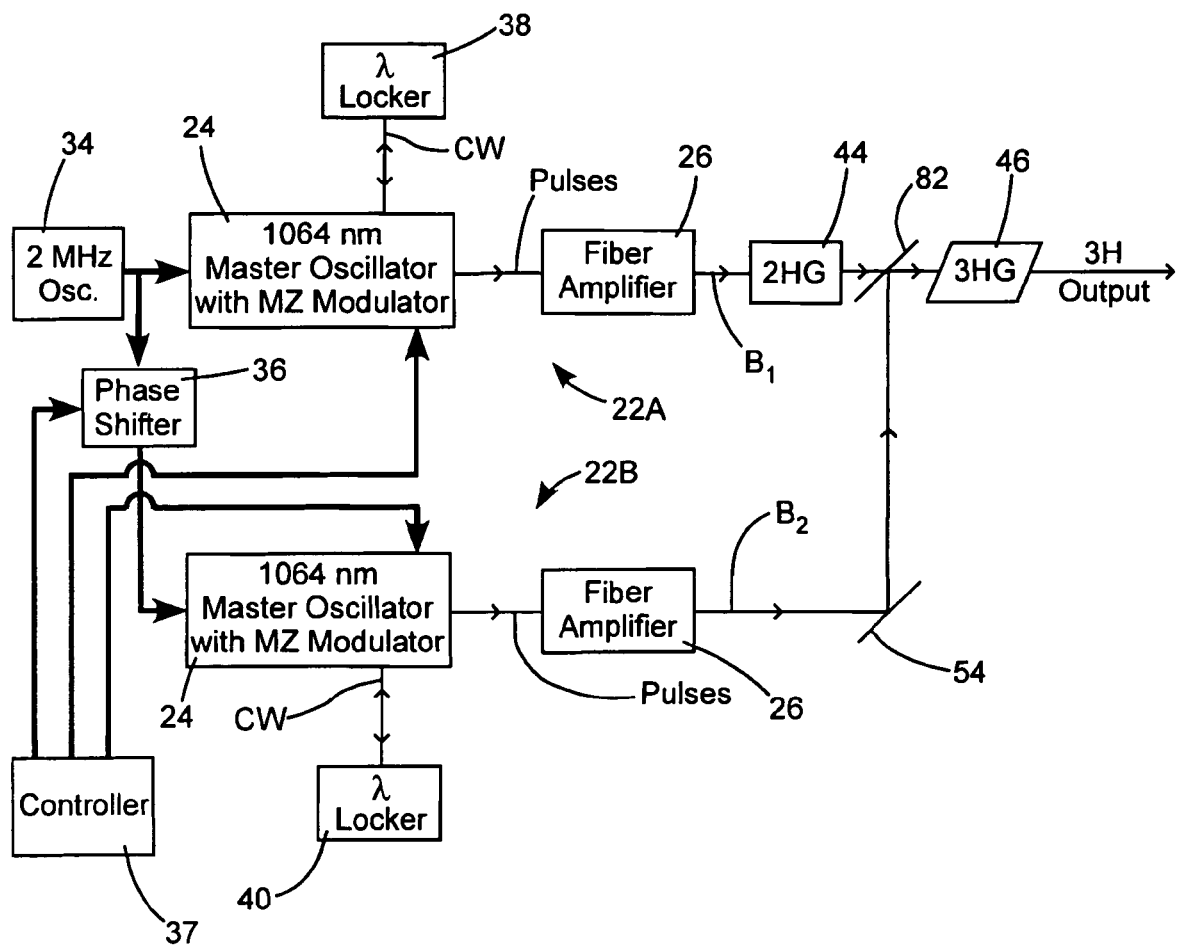
FIG. 7 schematically illustrates one embodiment of apparatus in accordance with the present invention arranged for implementing the amplitude modulation method of FIGS. 6A-C to provide amplitude modulated third-harmonic radiation from two lasers having the same fundamental wavelength.

FIG. 7 schematically illustrates one embodiment 80 of apparatus in accordance with the present invention arranged to deliver pulses at the third-harmonic wavelength of two lasers having a fundamental wavelength of 1064 nm. For convenience of description the lasers, here, are two MOPAs 22 from apparatus 20 of FIG. 1 with the phase relationship between pulse trains thereof controlled as described above. MOPAs 22 are designated here, for convenience of description as a MOPA 22A and a MOPA 22B. In apparatus 80, output pulses of MOPA 22A are frequency-doubled in an optically nonlinear crystal 44 as described above and delivered along a beam path $B_1$ to an optically nonlinear crystal 46. Pulses of fundamental radiation are delivered by MOPA 22B along a path $B_2$. Path $B_2$ is folded by mirror 54 and combined with path B1 by a dichroic mirror (beam combiner) 82 arranged to transmit the second harmonic and reflect the fundamental radiation. Crystal 46 mixes fundamental-radiation pulses from path $B_2$ with 2H pulses and residual fundamental pulses from path $B_1$ to generate the desired 3H-radiation pulses. Amplitude modulation of the 3H pulses can be effected by varying the phase relationship between the fundamental pulse trains from the two MOPAs as discussed above. In this apparatus 3H-radiation pulses will still have a finite amplitude when there is no temporal overlap between pulses in paths $B_1$ and $B_2$. This because residual fundamental pulses in path $B_1$ will still be mixed in crystal 46 with 2H pulses in path $B_1$.

Figure 8:
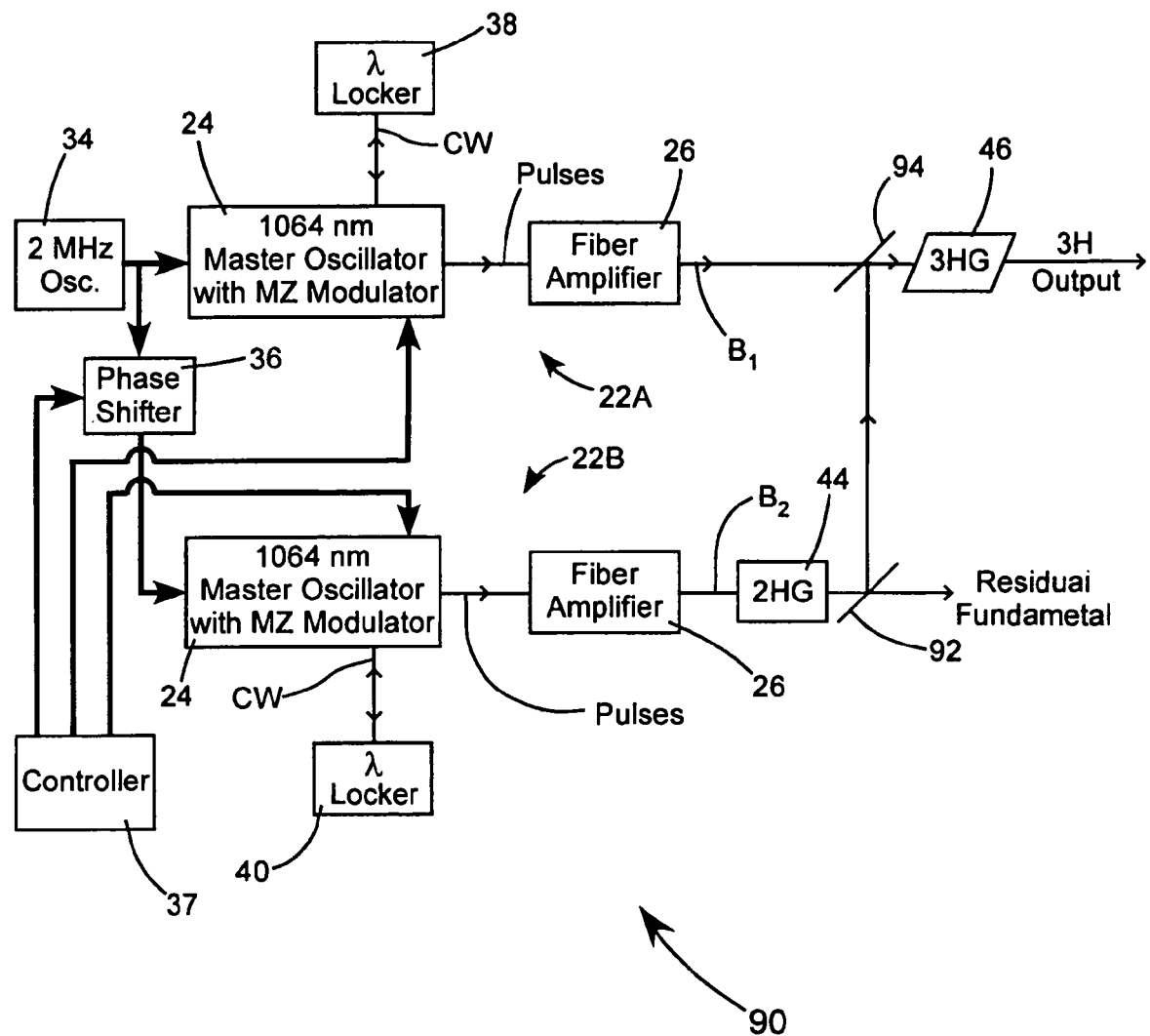
FIG. 8 schematically illustrates another embodiment of apparatus in accordance with the present invention arranged for implementing the amplitude modulation method of FIGS. 5A-C to provide digitally modulated third-harmonic radiation from two lasers having the same fundamental wavelength.

FIG. 8 schematically illustrates another embodiment 90 of apparatus in accordance with the present invention arranged to deliver pulses at the third-harmonic wavelength of two lasers having a fundamental wavelength of 1064 nm. In apparatus 90 fundamental output pulses of MOPA 22A are and delivered along a beam path $B_1$ to an optically nonlinear crystal 46. Pulses of fundamental radiation delivered by MOPA 22B are frequency doubled in an optically nonlinear crystal 44 as described above and propagate along a path $B_2$. Path $B_2$ is folded by a dichroic mirror 92 arranged to reflect the 2H-radiation and transmit residual fundamental radiation. Path $B_2$ is combined with path $B_1$ by a dichroic mirror (beam combiner) 94 arranged to reflect the 2H-radiation and transmit the fundamental radiation. Crystal 46 mixes fundamental-radiation pulses from path $B_1$ with 2H pulses from path $B_2$ to generate the desired 3H-radiation pulses. Digital modulation of the 3H pulses can be effected in apparatus 90 by varying the phase relationship between the fundamental pulse trains from the two MOPAs as discussed above. The digital modulation is possible as no residual fundamental radiation takes part in the 3H-generation process.

It is emphasized again that the frequency-converted-output modulation scheme described above is not limited to use with the optical fiber MOPAs of FIGS. 7 and 8. By way of example, the fiber MOPAs could be replaced by Q-switched, diode-pumped solid-state lasers such as Nd:YAG or Nd:YVO$_4$ lasers each of which can provide pulsed fundamental radiation at the 1064 nm wavelength. PRF of such lasers can be controlled by operating the Q-switches synchronously with the 2 MHz (or some other frequency) RF signal of oscillator 36 via an appropriate phase-shifter.

Figure 9:
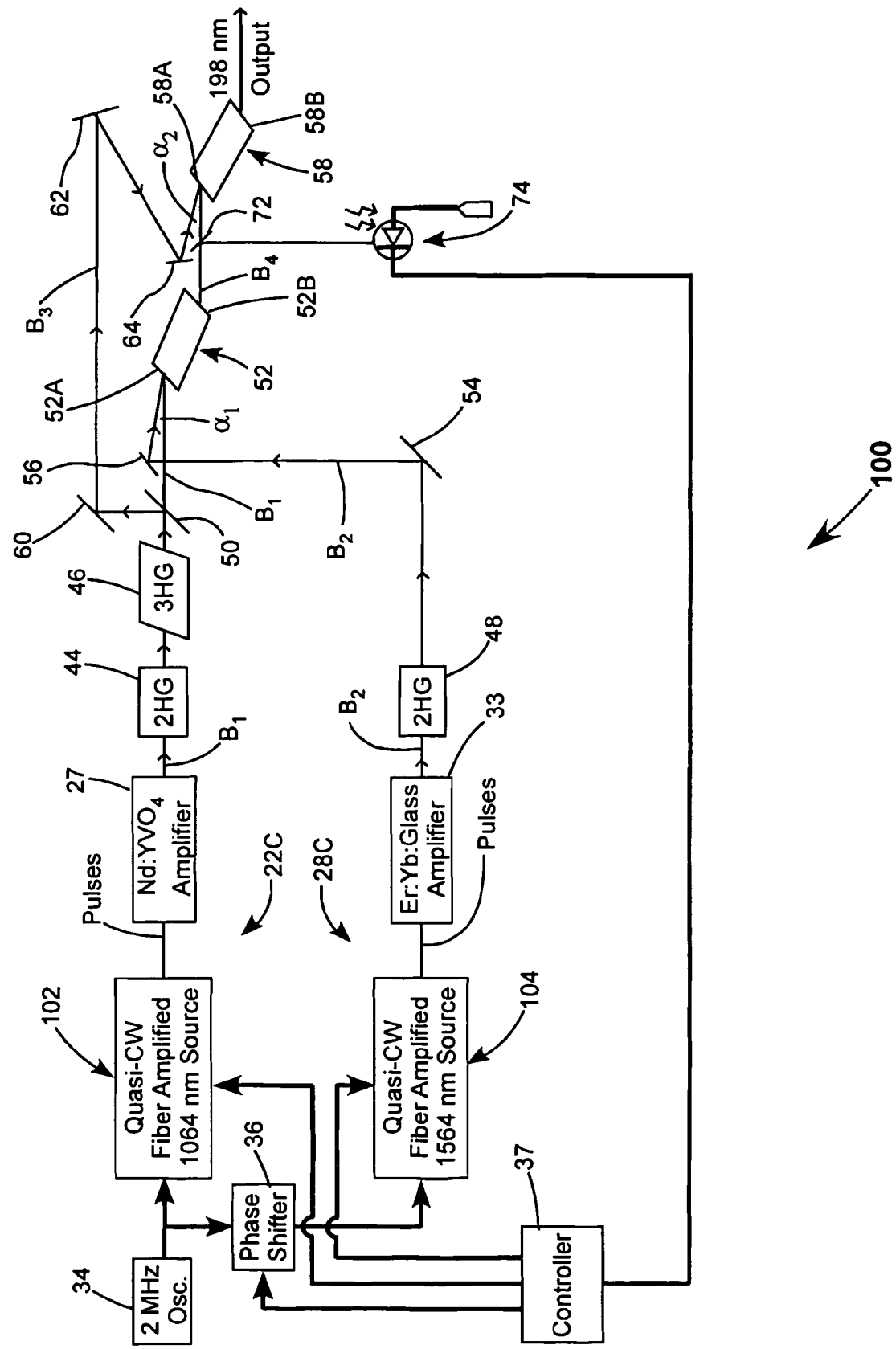
FIG. 9 schematically illustrates another preferred embodiment apparatus in accordance with the present invention similar to the apparatus of FIG. 1 but wherein the first and second MOPAs include a diode-laser master oscillator the output of which is amplified by a fiber amplifier, with the output of the fiber amplifier being further amplified by a bulk solid-state amplifier.

FIG. 9 schematically illustrates a further embodiment 100 of laser apparatus in accordance with the present invention. Apparatus 100 is similar to apparatus 20 of FIG. 1 with an exception that MOPA lasers (MOPAs) 22 and 28 of apparatus 20, each of which includes an optical fiber amplifier as a final amplification stage, are replaced in apparatus 100 by MOPA lasers 22C and 28C respectively, each of which includes a bulk, solid-state amplifier as a final amplification stage. MOPA 22C includes a quasi-CW fiber amplified laser source 102 having an output wavelength of 1064 nm and a bulk, neodymium-doped yttrium vanadate (Nd:YVO$_4$) amplifier 27, for amplifying the 1064 nm output. Such a source is preferably end-pumped by radiation from one or more arrays of diode-lasers emitting radiation at a wavelength of 808 nm. MOPA 28C includes a quasi-CW, fiber-amplified laser source 104 having an output wavelength of 1564 nm, and a bulk, erbium-and-ytterbium-doped glass (Er:Yb:Glass) amplifier 27 for amplifying the 1564 nm output. Such a source is preferably end-pumped by light from one or more arrays of diode-lasers emitting radiation at a wavelength of 980 nm, as is known in the art. The term "quasi-CW" here refers to a laser source having a pulsed output at a pulse-repetition frequency (PRF) of about 0.2 MHz or greater. Sources 102 and 104 are exemplified as having a PRF of 2.0 MHz, slaved to master clock 34.

Figure 10:
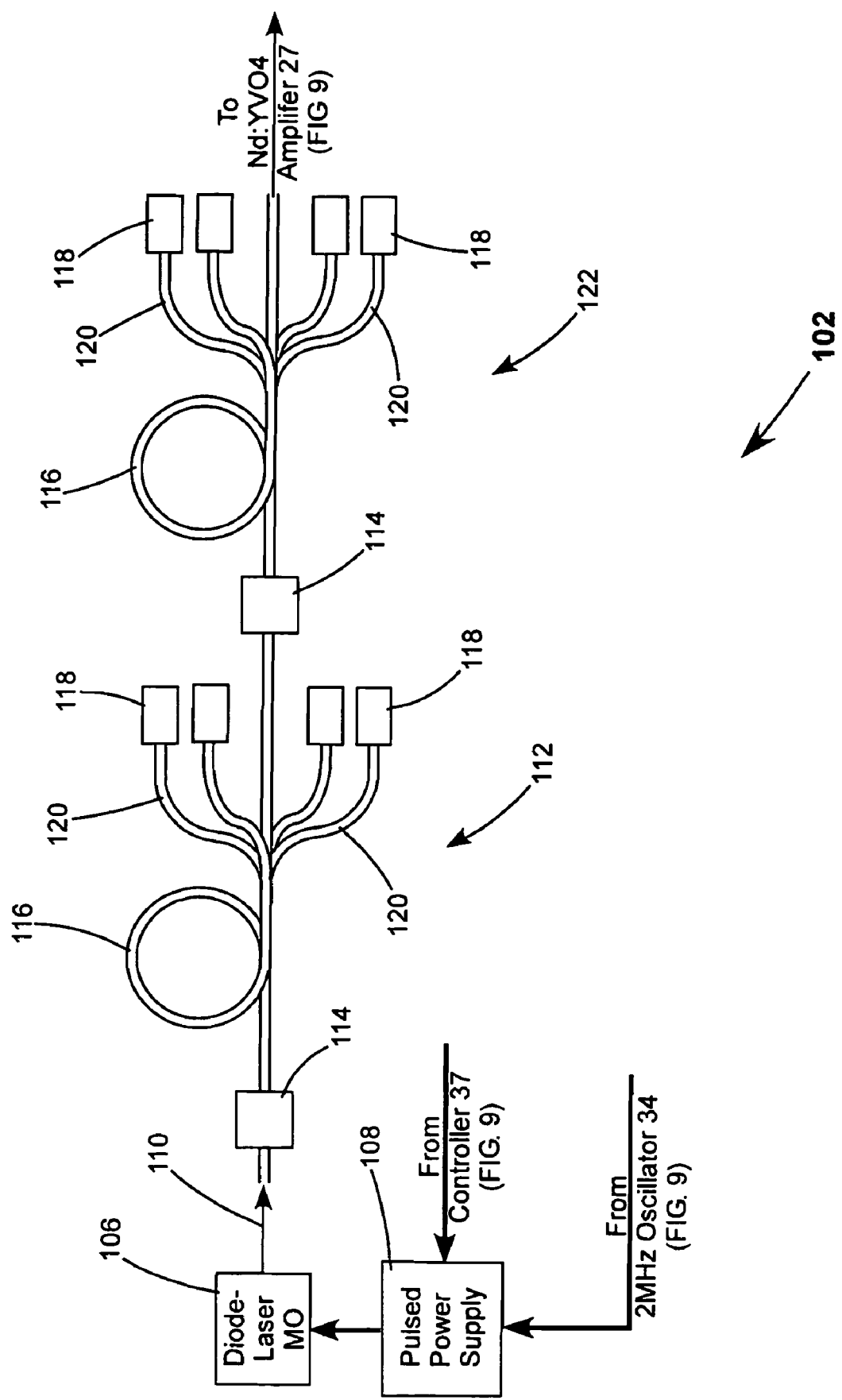
FIG. 10 schematically illustrates details of the first MOPA of FIG. 9.

FIG. 10 schematically illustrates a preferred example of 1064 nm source 102. A single-mode diode-laser 106 driven by a pulsed power supply 108 serves as a master oscillator (MO), and provides pulsed output at a frequency (here 2 MHz) slaved to master clock 34 of apparatus 100 (see FIG. 9). Pulse duration is controlled by signals delivered to power supply 108 from controller 37 of apparatus 100. Output from diode-laser 106 is directed by an optical arrangement (not shown) into a first optical fiber amplifier stage 112. Amplifier stage 112 includes an ytterbium-doped gain-fiber 116 optically pumped by a plurality (here, four) of diode-lasers 118 emitting CW radiation at a wavelength of 980 nm. The output of each diode-laser 118 is coupled into cladding of the gain-fiber by a fiber 120 fused into the cladding of the gain fiber. An isolator 114 prevents feedback from amplifier stage 112 into the diode-laser. Amplified (pre-amplified) pulses are delivered from first amplifier stage 112 into a second fiber-amplifier stage 122, here, configured similarly to the first amplifier stage. Further pre-amplified pulses from amplifier stage 122 are delivered via an optical arrangement (not shown) to solid-state Nd:YVO$_4$ amplifier 27 of laser apparatus 100 (see FIG. 9) for final amplification.

Figure 11:
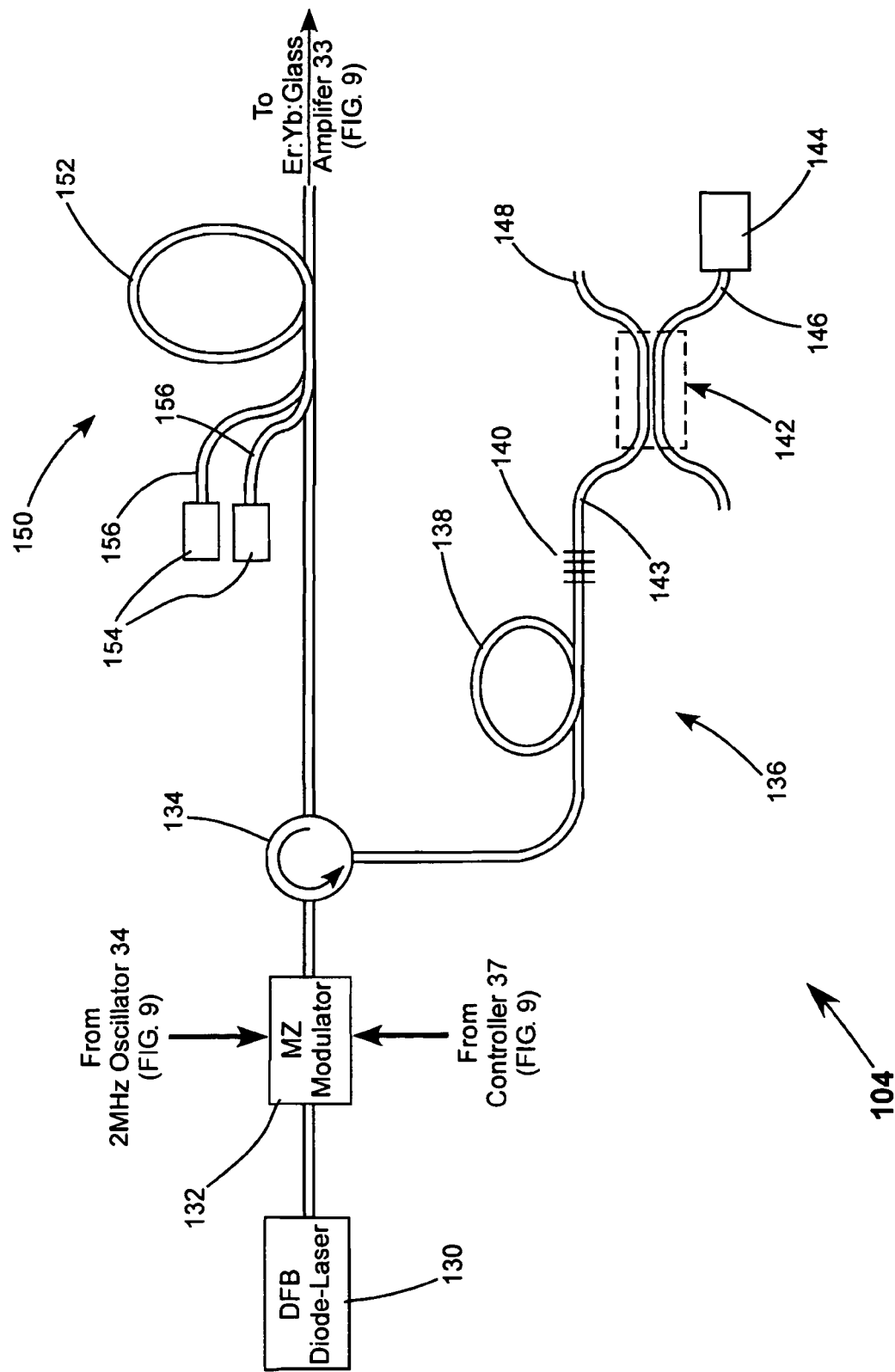
FIG. 11 schematically illustrates details of the second MOPA of FIG. 9.

FIG. 11 schematically illustrates a preferred example of 1564 nm source 104. A distributed feedback (DFB) single-mode diode-laser 130 delivers CW output at a wavelength of 1564 nm and serves as a master oscillator. Output of diode-laser 130 is fiber coupled to MZ modulator 132. MZ modulator converts the CW output to a train of pulses at a pulse repetition frequency (PRF) that is determined by the frequency of oscillator or master clock 34 of apparatus 100 (see FIG. 9). Pulse duration is controlled by keying-signals delivered to the MZ modulator from controller 37 of apparatus 100. The train of pulses is directed by a circulator 134 into a first optical fiber amplifier stage 136.

Amplifier 136 is a double-pass amplifier including an erbium-doped gain-fiber 138 having a fiber Bragg grating (FBG) 140 at a distal end thereof and written into the core of the gain-fiber. FBG 140 is strongly reflective at a wavelength of 1564 nm and has a reflection bandwidth of about 1 nm or less. The distal end of the gain fiber is connected to a first port 143 of a wavelength division multiplexer (WDM) 142. Gain fiber 138 is optically pumped by CW radiation delivered by a diode-laser 144 and having a wavelength of 980 nm. The radiation from diode-laser 144 is coupled into gain-fiber 138 via a second port 146 of WDM 142. The FBG 140 reflects pulses amplified on a first pass through gain-fiber back through the gain fiber for amplification in a return pass. Most of any amplified spontaneous emission (ASE) generated in the first (forward) pass direction in the gain-fiber is transmitted by FBG 140, enters port 143 of the WDM, and exits the WDM via a third port 148 thereof.

Pulses pre-amplified in double-pass fiber amplifier 136 return to circulator 134 and are directed by the circulator into a second optical fiber amplifier stage 150 for further pre-amplification. Amplifier stage 150 includes an ytterbium-sensitized erbium-doped gain-fiber 152, optically pumped by a plurality (here, two) of diode-lasers 154, emitting CW radiation at a wavelength of 980 nm. The output of each diode-laser 154 is coupled into cladding of the gain-fiber by a fiber 156 fused into the cladding of the gain fiber. Amplified pulses from amplifier stage 150 are delivered via an optical arrangement (not shown) to solid-state Er:Yb:Glass amplifier 33 of laser apparatus 100 (see FIG. 9) for final amplification.

The arrangement of apparatus 100 of FIG. 9 has an advantage over apparatus 20 of FIG. 1, which has the same frequency conversion architecture, inasmuch as higher output power from the two lasers is possible, and correspondingly higher UV output power of the apparatus is possible. By way of example, in an example of source 102 wherein diode-laser 106 delivers an average power of between about 50 milliwatts (mW) and 100 mW in a 2 MHz train of 2 ns pulses, and wherein amplifier stages 112 and 122 are each pumped by a total of 10 watts of 980-nm diode-laser radiation, a 2 MHz train of 2 ns 1064 nm-pulses having an average power of about 5 W can be delivered to solid-state Nd:YVO$_4$ amplifier 27. Amplifier 27, depending on factors including gain-medium (crystal) length and pump power, can amplify this train of pulses to provide a train of 1064 nm-pulses having an average power of up to 50 W. In an example of source 104 wherein DFB diode-laser 130, modulated by MZ modulator 132 delivers an average power of between about 50 mW and 100 mW in a 2 MHz train of 2 ns-pulses, and wherein amplifier stage 136 is pumped by 10 W watts of diode-laser radiation, and amplifier stage 150 is pumped by a total of 20 W watts of 980-nm diode-laser radiation, a 2 MHz train of 2 ns 1.564-nm pulses having an average power of about 2 W can be delivered to solid-state Er:Yb:Glass amplifier 33. Amplifier 33, again depending on factors including gain-medium (rod) length and pump power, can amplify this train of pulses to provide a train of 1564 nm-pulses having an average power of up to 10 W. According to the calculations used to generate the plots of FIG. 3, in the apparatus of FIG. 9, 50 W of 1064 nm power delivered from amplifier 27 and 10 W of 1064 nm power delivered from amplifier 33 can produce an average output power at 198 nm of 4 W.

In summary, the present invention is described above in terms of a preferred and other embodiments. The invention is not limited, however, to the embodiments described and depicted. Rather, the invention is limited only by the claims appended hereto.

What is claimed is:

1. A method of generating optical pulses, comprising the steps of:

generating output pulses having a first fundamental wavelength from a first laser;

generating output pulses having a second fundamental wavelength from a second laser;

frequency-multiplying said first fundamental wavelength output pulses to provide pulses having a wavelength which is a harmonic wavelength of said first fundamental wavelength;

frequency-multiplying said second fundamental wavelength output pulses to provide pulses having a wavelength which a harmonic wavelength of said second fundamental wavelength;

sum-frequency mixing said harmonic-wavelength pulses to provide frequency-converted pulses having a first frequency-converted wavelength that is less than either of said harmonic wavelengths; and sum-frequency mixing said frequency-converted-wavelength pulses with fundamental-wavelength pulses from one of said first and second lasers to provide frequency-converted pulses having a second frequency-converted wavelength, said second frequency-converted wavelength being less than said first frequency-converted wavelength.

2. The method of claim 1, wherein one of said first and second lasers include an optical fiber master oscillator providing seed pulses, and an optical fiber amplifier for amplifying said seed pulses to provide said output pulses.

3. The method of claim 1, wherein one of said first and second lasers include a source of seed pulses, an optical fiber amplifier including one or more stages of amplification for pre-amplifying said pulses, and a solid state amplifier for finally amplifying said pre-amplified pulses to provide said output pulses.

4. The method of claim 1, wherein said first and second fundamental wavelengths are each between about 800 nanometers and 1700 nanometers and are different.

5. A method of generating optical pulses, comprising the steps of:

generating output pulses having a first fundamental wavelength from a first laser, said first fundamental wavelength being between about 800 nanometers and 1700 nanometers;

generating output pulses having a second fundamental wavelength from a second laser, said second fundamental wavelength being between about 800 nanometers and 1700 nanometers;

frequency-multiplying said first fundamental wavelength output pulses to provide pulses having a wavelength which is a harmonic wavelength of said first fundamental wavelength;

frequency-multiplying said second fundamental wavelength output pulses to provide pulses having a wavelength which a harmonic wavelength of said second fundamental wavelength;

sum-frequency mixing said harmonic-wavelength pulses to provide frequency-converted pulses having a first frequency-converted wavelength that is less than either of said harmonic wavelengths; and sum-frequency mixing said frequency-converted-wavelength pulses with unconverted fundamental-wavelength pulses from one of said first and second lasers to provide frequency-converted pulses having a second frequency-converted wavelength, said second frequency-converted wavelength being less than said first frequency-converted wavelength.

6. The method of claim 5, wherein said second frequency-converted wavelength is not a harmonic wavelength of either said first fundamental wavelength or said second fundamental wavelength.

7. The method of claim 5, wherein said first fundamental wavelength is between about 1040 nanometers and 1060 nanometers and said second fundamental wavelength is between about 1510 nanometers and 1570 nanometers.

8. The method of claim 7, wherein said first fundamental wavelength is about 1064 nanometers and said second fundamental wavelength is about 1564 nanometers.

9. The method of claim 8, wherein said first fundamental wavelength output pulses are frequency multiplied to provide pulses having a wavelength which is the third-harmonic wavelength of said first fundamental wavelength, said second fundamental wavelength output pulses are frequency multiplied to provide pulses having a wavelength which is the second-harmonic wavelength of said second fundamental wavelength, wherein unconverted first fundamental wavelength pulses are sum-frequency mixed with said first frequency-converted wavelength pulses, and wherein said second frequency-converted wavelength pulses have a wavelength of about 198 nm.

10. The method of claim 5, wherein one of said first and second lasers include an optical fiber master oscillator providing seed pulses, and an optical fiber amplifier for amplifying said seed pulses to provide said output pulses.

11. The method of claim 5, wherein one of said first and second lasers include a source of seed pulses, an optical fiber amplifier including one or more stages of amplification for pre-amplifying said pulses, and a solid state amplifier for finally amplifying said pre-amplified pulses to provide said output pulses.

12. Optical apparatus, comprising
a first laser arranged to generate output pulses having a first fundamental wavelength;
a second laser arranged to generate output pulses having a second fundamental wavelength;
first and second optically nonlinear crystals arranged to triple the frequency the frequency of the first-fundamental-wavelength pulses to provide frequency-tripled pulses having the third-harmonic wavelength of the first fundamental wavelength;
a third optically nonlinear crystal arranged to double the frequency the frequency of the second-fundamental-wavelength pulses to provide frequency-doubled pulses having the second-harmonic wavelength of the second fundamental wavelength;
a fourth optically non-linear crystal arranged to sum-frequency mix the frequency-tripled and frequency-doubled pulses to provide first frequency-converted pulses having a wavelength less than the third-harmonic wavelength of the first fundamental wavelength and the second-harmonic wavelength of the second fundamental wavelength; and
a fifth optically non linear crystal arranged to sum-frequency mix the first frequency-converted pulses with unconverted first fundamental wavelength-pulses to provide second frequency-converted pulses having a wavelength less than that of the first frequency-converted pulses.

13. The apparatus of claim 12, wherein one of said first and second lasers include an optical fiber master oscillator providing seed pulses, and an optical fiber amplifier for amplifying said seed pulses to provide said output pulses.

14. The apparatus of claim 12, wherein one of said first and second lasers include a source of seed pulses, an optical fiber amplifier including one or more stages of amplification for pre-amplifying said pulses, and a solid state amplifier for finally amplifying said pre-amplified pulses to provide said output pulses.

15. The apparatus of claim 12, wherein said first fundamental wavelength is between about 1040 nanometers and 1060 nanometers and said second fundamental wavelength is between about 1510 nanometers and 1570 nanometers.

16. The apparatus of claim 15, wherein said first and second fundamental wavelengths are respectively about 1064 nanometers and about 1564 nanometers and said second frequency-converted pulses have a wavelength of about 198 nm.

17. The apparatus of claim 12, wherein said first fundamental wavelength output pulses and second fundamental wavelength output pulses are each delivered in a repeated sequence thereof, and wherein the apparatus further includes an electro-optical arrangement for equalizing the repetition frequency and varying the phase relationship of said first and second fundamental wavelength output pulses.

18. The apparatus of claim 17, wherein the phase relationship of said first and second fundamental wavelength output pulses is adjusted such that said frequency-tripled and frequency doubled pulses arrive simultaneously at said fourth optically nonlinear crystal for sum-frequency mixing.

19. The apparatus of claim 17, wherein the phase relationship of said first and second fundamental wavelength output pulses can be selectively varied to provide a variable degree of temporal overlap of said frequency-tripled and frequency doubled pulses at said fourth optically nonlinear crystal, for modulating said first frequency-converted pulses.

20. The apparatus of claim 17, wherein said fourth optically nonlinear crystal is arranged for type-I phase-matching, and said frequency-tripled and frequency-doubled pulses are incident on a entrance face of said fourth optically nonlinear crystal along respectively first and second beam paths beam paths at an angle to each other.

21. The apparatus of claim 20, wherein each of said first and second beam paths is incident on said entrance face of said fourth optically nonlinear crystal at Brewster's angle for the material of the crystal at the wavelength of the pulses.

22. The apparatus of claim 20, wherein said fifth optically nonlinear crystal is arranged for type-I phase-matching, and said first frequency-converted pulses and said unconverted first wavelength pulses are incident on a entrance face of said fifth optically nonlinear crystal along respectively third and fourth beam paths at an angle to each other.

23. The apparatus of claim 22, wherein each of said third and fourth beam paths is incident on said entrance face of said fifth optically nonlinear crystal at Brewster's angle for the material of the crystal at the wavelength of the pulses.

* * * * *